US006801611B2

(12) United States Patent
Guccione et al.

(10) Patent No.: US 6,801,611 B2
(45) Date of Patent: Oct. 5, 2004

(54) CALL POD FOR HAVING CONFERENCE CALLS IN A PORTABLE ENVIRONMENT

(75) Inventors: Darren Guccione, Chicago, IL (US); Daniel Morris Lurey, Hoffman Estates, IL (US)

(73) Assignee: Callpod, Inc., Chicago, IL (US)

( * ) Notice: Subject to any disclaimer, the term of this patent is extended or adjusted under 35 U.S.C. 154(b) by 445 days.

(21) Appl. No.: 09/896,671

(22) Filed: Jun. 29, 2001

(65) Prior Publication Data

US 2003/0002644 A1 Jan. 2, 2003

(51) Int. Cl.$^7$ ................................................. H04M 3/42
(52) U.S. Cl. ............... 379/202.01; 455/416; 455/575.2; 455/556.1; 379/387.01
(58) Field of Search .......................... 379/202.01, 93.21, 379/428.02, 158, 205.01; 455/416, 417, 414.1, 575.2, 556.1

(56) References Cited

U.S. PATENT DOCUMENTS

| | | | |
|---|---|---|---|
| 3,601,904 A | 8/1971 | Elliott et al. .................. 35/8 A |
| 4,229,829 A | 10/1980 | Grunwald ................... 455/600 |
| 4,882,745 A | 11/1989 | Silver .......................... 379/61 |
| 5,359,647 A | 10/1994 | Regen et al. ................. 379/56 |
| 5,487,182 A | 1/1996 | Hansson ....................... 455/90 |
| 5,590,417 A | 12/1996 | Rydbeck ....................... 455/89 |
| 5,596,638 A | 1/1997 | Paterson et al. ............. 379/430 |
| RE35,536 E | 6/1997 | Irissou et al. ............... 379/395 |
| 5,812,683 A | 9/1998 | Parker et al. ................. 381/74 |
| 5,844,824 A | 12/1998 | Newman et al. ......... 364/708.1 |
| 5,890,074 A | 3/1999 | Rydbeck et al. ............. 455/558 |
| 5,983,100 A | 11/1999 | Johansson et al. .......... 455/426 |
| 6,026,082 A | 2/2000 | Astrin ......................... 370/336 |
| 6,130,602 A | 10/2000 | O'Toole et al. .......... 340/10.33 |
| 6,321,080 B1 * | 11/2001 | Diethorn ..................... 455/416 |
| 6,615,059 B1 * | 9/2003 | Pehrsson et al. ............ 455/557 |

FOREIGN PATENT DOCUMENTS

EP                0187696 A2 * 1/1986 ............ H04M/3/56

* cited by examiner

*Primary Examiner*—Fan Tsang
*Assistant Examiner*—Olisa Anwah
(74) *Attorney, Agent, or Firm*—Welsh & Katz, Ltd.

(57) ABSTRACT

A method and apparatus are provided for establishing a conference call connection among a plurality of conference call participants. The method includes the steps of providing a call pod for interconnecting a plurality of headsets of the plurality of participants, operably connecting a headset interface of a wireless telephone with a wireless telephone audio interface of the call pod and forming a two-way voice path among the plurality of headsets and the wireless telephone interface within the call pod.

22 Claims, 3 Drawing Sheets

US 6,801,611 B2

CALL POD FOR HAVING CONFERENCE CALLS IN A PORTABLE ENVIRONMENT

FIELD OF THE INVENTION

The field of the invention relates to communication systems. More particularly, the field of the invention relates to conferenced telephone calls.

BACKGROUND OF THE INVENTION

The use of wireless telephones for communicating is well known. The use of wireless telephones for setting-up conference calls within the public switch telephone network (PSTN) is also known.

To form a conference call connection, a caller typically calls a PSTN operator and gives the operator a list of telephone numbers of participants to the conference call. The operator receives the telephone numbers and individually calls the participants.

To conference-in the participants, the operator invokes special features of a telephone switch within the PSTN. Within the switch, the call connection with each participant is typically divided into an incoming audio path (from a microphone of the participant) and an outbound audio path (to an audio speaker of the participant). To form a conference connection, the information on the inbound path of each participant must be summed with the information on the inbound paths of every other participant, and averaged. The summed and averaged information is then distributed to the participants on each outbound path.

While the conferencing features of the PSTN work well, they are sometimes difficult to access, set up and use. Further, where some of the participants are in a single location, the cost of a conference connection may not be justified. Accordingly, a need exists for a conferencing device that is easier to use and more amenable to use by local participants.

SUMMARY

A method and apparatus are provided for establishing a conference call connection among a plurality of conference call participants. The method includes the steps of providing a call pod for interconnecting a plurality of headsets of the plurality of participants, operably connecting a headset interface of a wireless telephone with a wireless audio interface of the call pod and forming a two-way voice path among the plurality of headsets and the wireless interface within the call pod.

DETAILED DESCRIPTION OF THE PREFERRED EMBODIMENT

Figure 1:
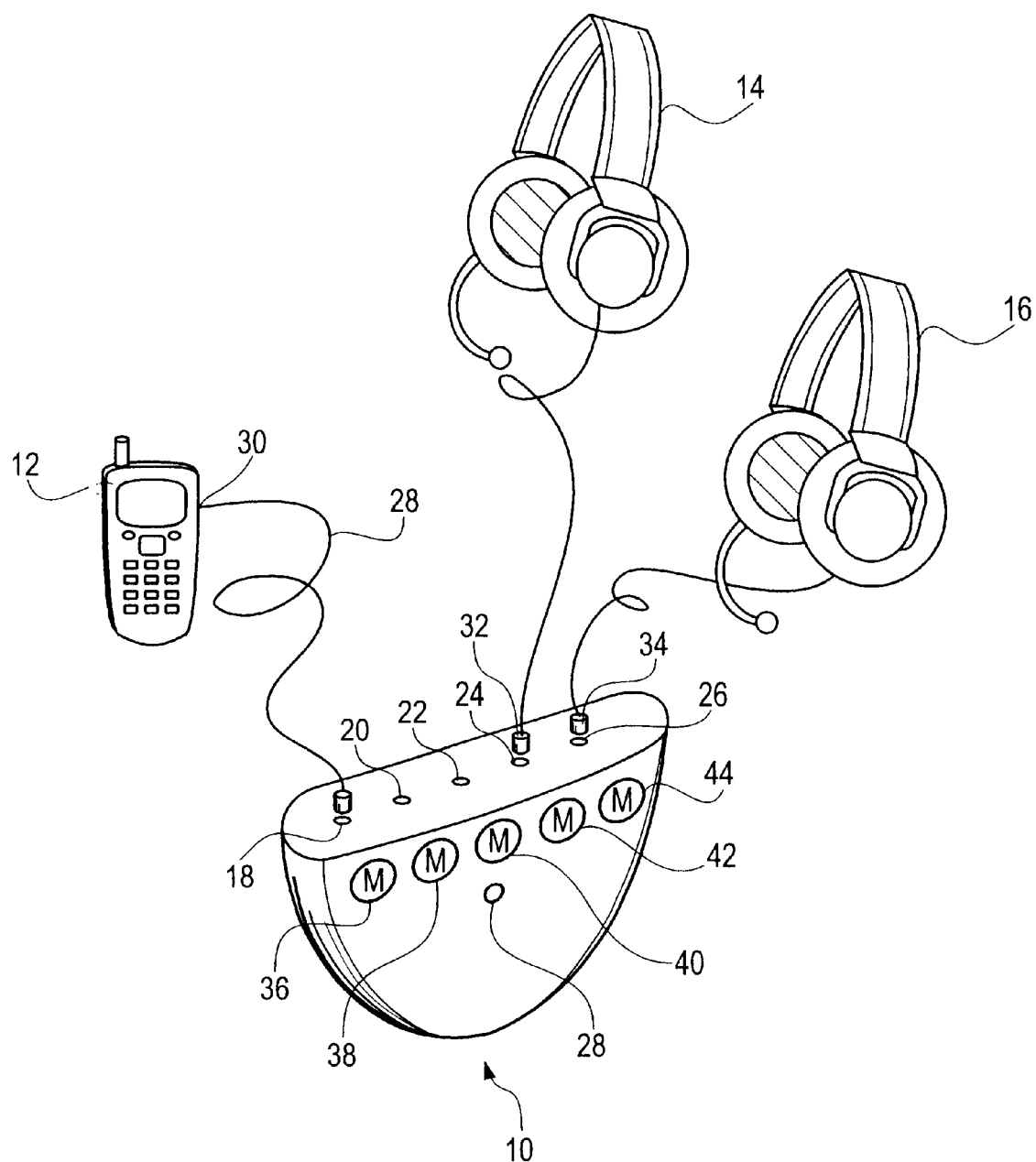
FIG. 1 is a perspective view of a conferencing device in accordance with an illustrated embodiment of the invention.

FIG. 1 depicts a call pod 10, shown generally under an illustrate embodiment of the invention and in a context of use. As shown, a wireless telephone (e.g., cellphone, cordless telephone, PCS telephone, digital cellular, TDMA, CDMA, GSM, etc.) 12 may be coupled to the call pod 10 by use of an interconnecting cable 28 disposed between a headset receptacle 30 of the wireless phone 12 and wireless audio interface receptacle 18 of the call pod 10. Similarly, a number of headsets 14, 16 may be connected to the pod 10 by connecting a headset plug 32, 34 into headset receptacle 20, 22, 24, 26. Each headset 14, 16 may be of the "hands-free" variety consisting of an earphone part and a microphone part.

The call pod 10 allows several persons on one side of a conversation to listen and speak without using a "speakerphone". The use of the call pod 10 overcomes the annoying speakerphone characteristic that one participant may begin to speak at the same time the party at the other end of the conversation is speaking. This causes one party not to be heard by the other, because the speakerphone is a simplex device that must switch from receive to transmit when the local party begins to speak. In contrast to a speakerphone, the call pod 10 allows duplex operation, even when several persons at the local end and far end wish to speak simultaneously.

While only two headsets 14, 16 are shown in FIG. 1, it is to be understood that any number of headsets 14, 16 may be used with the call pod 10. It is also to be understood that as used herein, a "call pod" is a portable telephone device which forms conference calls among a plurality of call participants, at least two of which are proximate the call pod 10.

Figure 2:
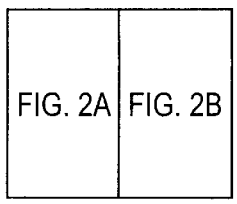
FIG. 2 is a schematic of the conferencing device of FIG. 1.
Figure 2A:
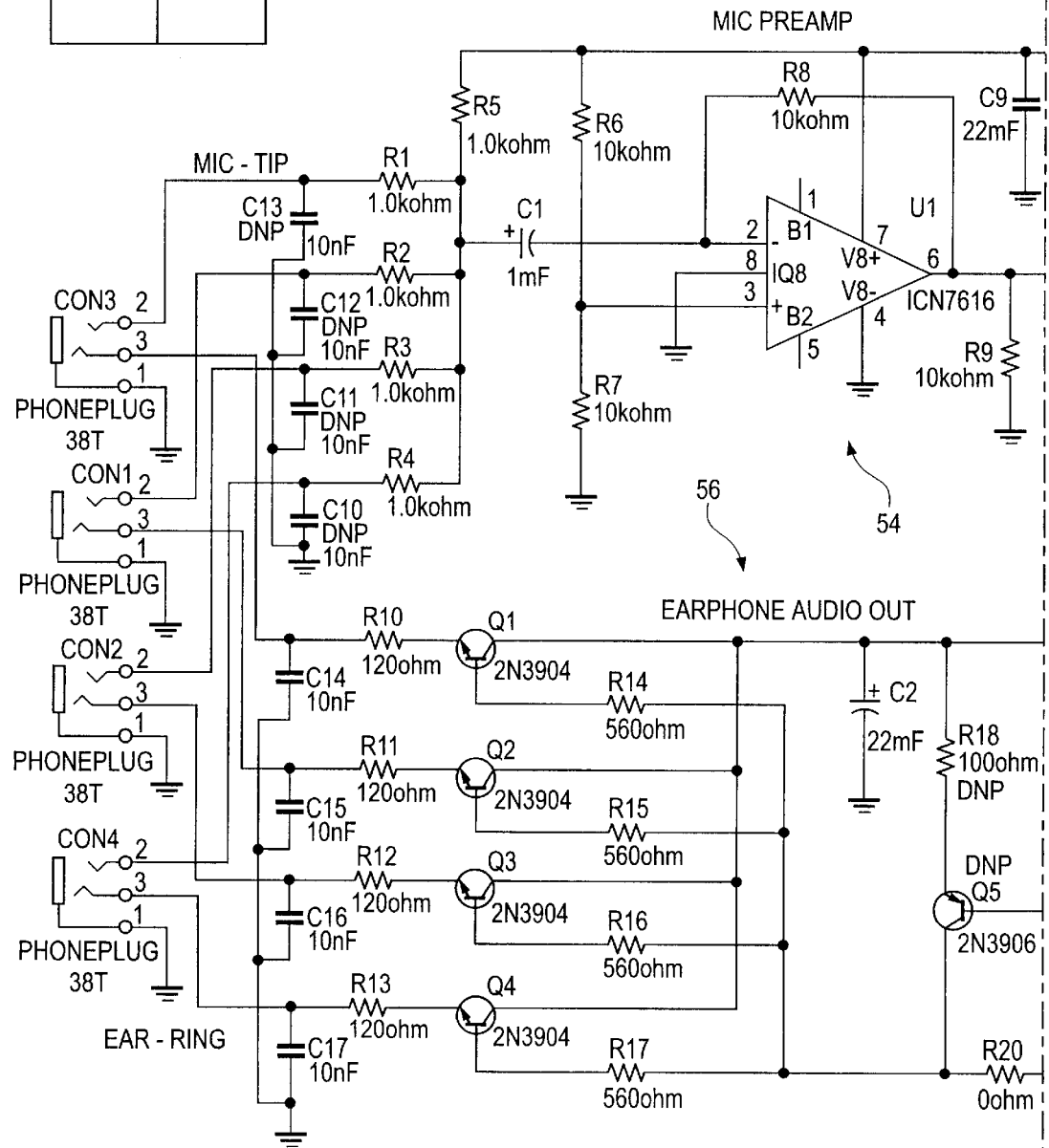
Figure 2B:
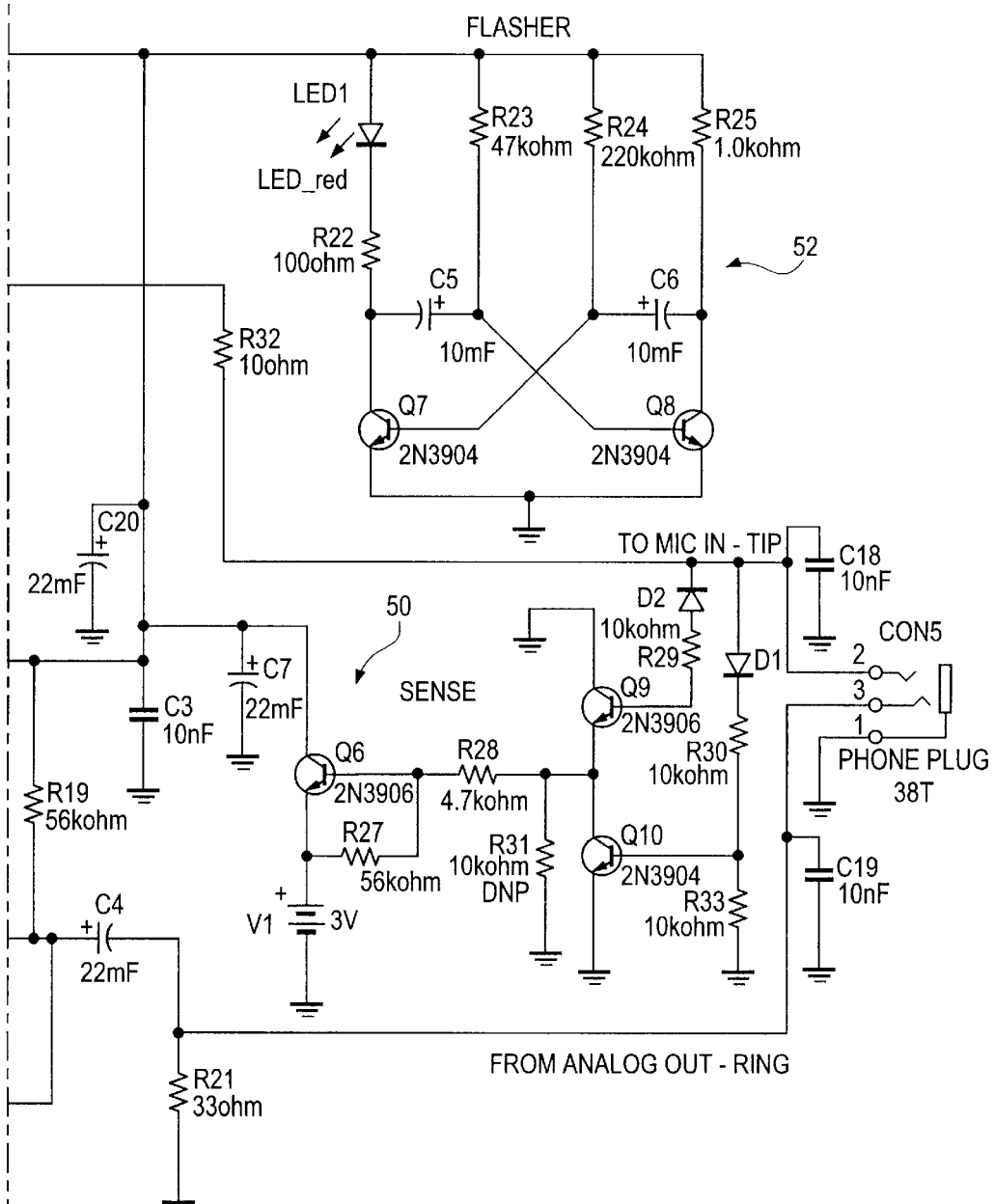

FIG. 2 is a schematic of the pod 10. Shown in the schematic are plug receptacles CON1, CON2, CON3 and CON4 which correspond to the headset receptacles 20, 22, 24, 26 of FIG. 1, respectively. Also shown in FIG. 2 is plug receptacle CON5 which corresponds to the wireless telephone audio interface 18 of FIG. 1.

Under the illustrated embodiment, the call pod 10 relies upon four circuits 50, 52, 54, 56 to facilitate conferencing functions. The first circuit may be a sense circuit 50 structured to automatically activate the call pod 10 during use and deactivate the call pod 10 when not in use. The second circuit may be a flasher circuit 52 which works in conjunction with the sense circuit 50. The flasher circuit 52 may be a free-running multivibrator that sequentially activates and deactivates a light emitting diode LED1 28 at an appropriate cycling rate (e.g., one-half second).

The sense circuit 50 may operate by monitoring a microphone bias current on a microphone input #2 of the wireless telephone audio interface CON5. The bias current provided by the wireless telephone 12 may be used to activate the call pod 10 during a call, thereby eliminating the need for a power switch that a local party would manually operate each time a call was received or placed. It should be noted that the bias current from the wireless telephone 12 is only present during the time a call is in progress.

Furthermore, it is possible that the voltage providing the bias current could be either positive or negative, depending upon the design of the wireless telephone 12. Diodes D1, D2 and transistors Q9 and Q10 provide a bias current detector and a control signal path to a power switch (e.g., transistor Q8), such that a bias current of either polarity causes transistor Q8 to conduct. Conduction of transistor Q8 activates the call pod 10.

The third and fourth circuits 54, 56 function to form the conferencing audio signal. The third circuit 54 senses a microphone input from each headset through a set of summing resistors R1, R2, R3, R4. Since the microphone parts of the headsets 14, 16 require a bias current, resistor R5 is provided as a source of such current.

The summed output from the microphones may be capacitively coupled through capacitor C1 into an opamp IQ8. IQ8 may be a conventional audio quality amplifier connected as a summing amplifier. Within the opamp IQ8, the summed microphone signal is amplified by an appropriate amplification factor (e.g., 10) and applied through a limiting resistor R32 to the microphone input #2 of the wireless telephone audio interface CON5.

Within the wireless telephone 12, a portion of the summed output from the third circuit 54 is added to a wireless telephone audio output signal and provided as feedback. The wireless telephone output (i.e., the conference output) is provided on output connection #3 of the wireless telephone audio interface CON5.

The wireless telephone output on pin #3 of the wireless telephone audio interface CON5 is amplified by transistor Q5 and provided as an input to balancing resistors R14, R15, R16, R17. The balancing resistors R14, R15, R16, R17 in turn drive respective earphone transistors Q1, Q2, Q3, Q4. The respective earphone transistors Q1, Q2, Q3, Q4, in turn, drive the respective earphones of the headsets 14, 16. Since the audio paths of the third and fourth circuits 54, 56 are not switched in any way, the duplex operation of the telephone circuit is preserved.

Under the illustrated embodiment, a number of local users may participate (using headsets 14, 16) in a conference call with a remote participant (not shown). The remote participant may be contacted through the wireless telephone 12 using conventional techniques.

Further, a local user may participate actively, or simply monitor the conversation. For example, if a user of a headset (e.g., 14) should want to passively monitor the call, then the user may activate a MUTE button 42. Activation of a MUTE button 38, 40, 42, 44 functions to disconnect a local user microphone of a headset 14, 16.

Further, a MUTE button 36 may also be provided for use with the remote participant. Muting the remote participant allows the local users to participate in a local conference without being heard by the remote participant.

The use of the call pod 10 offers other advantages not possible under prior art devices. For example, a number of local users can participate in a conference call in a public location without a complete loss of confidentiality. By using the headsets 14, 16, it is not likely that an eavesdropper could hear each local user. Even if the eavesdropper could hear all of the local users, the eavesdropper would still be unable to hear the contributions of the remote participant. As such, the call pod 10 functions to provide a high degree of confidentiality even in public places.

A specific embodiment of a method and apparatus for providing portable conference capabilities has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of providing a conference call connection among a plurality of conference call participants, such method comprising the steps of:

providing a call pod for interconnecting a plurality of headsets of the plurality of participants;

operably connecting a headset interface of a wireless telephone with a wireless telephone audio interface of the call pod; and forming a two-way voice path among the plurality of headsets and the wireless telephone interface within the call pod, wherein the call pod includes a sense circuit structured to automatically activate the call pod during a call and to automatically deactivate the call pod upon termination of the call wherein the sense circuit detects a microphone bias current on a microphone input of the wireless telephone and activates the call pod using the detected microphone bias current.

2. The method of providing a conference call connection as in claim 1 further comprising activating a flashing indicator upon detection of a call connection.

3. The method of providing a conference call connection as in claim 1 further comprising deactivating the call pod upon termination of a call connection.

4. The method of providing a conference call connection as in claim 1 further comprising detecting a positive bias current from the microphone connection of the wireless telephone.

5. The method of providing a conference call connection as in claim 4 further comprising detecting a negative bias current from the microphone connection of the wireless telephone.

6. The method of providing a conference call connection as in claim 1 further comprising muting a microphone of a call participant of the plurality of participants.

7. The method of providing a conference call connection as in claim 1 further comprising muting a headset of a participant of the plurality of participants.

8. The method of providing a conference call connection as in claim 1 further comprising muting the wireless telephone audio interface.

9. An apparatus for providing a conference call connection among a plurality of conference call participants, such apparatus comprising:

a call pod for interconnecting a plurality of headsets of the plurality of participants;

means for operably connecting a headset interface of a wireless telephone with a wireless telephone audio interface of the call pod; and means for forming a two-way voice path among the plurality of headsets and the wireless telephone interface within the call pod, wherein the call pod includes a sense circuit structured to automatically activate the call pod during a call and to automatically deactivate the call pod upon termination of the call wherein the sense circuit detects a microphone bias current on a microphone input of the wireless telephone and activates the call pod using the detected microphone bias current.

10. The apparatus for providing a conference call connection as in claim 9 further comprising means for activating the call pod upon detection of a call connection.

11. The apparatus for providing a conference call connection as in claim 9 further comprising means for activating a flashing indicator upon detection of a call connection.

12. The apparatus for providing a conference call connection as in claim 9 further comprising means for deactivating the call pod upon termination of a call connection.

13. The apparatus for providing a conference call connection as in claim 9 further comprising means for detecting a positive bias current from the microphone connection of the wireless telephone.

14. The apparatus for providing a conference call connection as in claim 12 further comprising means for detecting a negative bias current from the microphone connection of the wireless telephone.

15. The apparatus for providing a conference call connection as in claim 9 further comprising means for muting a microphone of a call participant of the plurality of participants.

16. The apparatus for providing a conference call connection as in claim 9 further comprising means for muting a headset of a participant of the plurality of participants.

17. The apparatus for providing a conference call connection as in claim 9 further comprising means for muting the wireless telephone audio interface.

18. An apparatus for providing a conference call connection among a plurality of conference call participants, such apparatus comprising:

a call pod for interconnecting a plurality of headsets of the plurality of participants;

a wireless telephone interconnect cable adapted to operably connect a headset interface of a wireless telephone with a wireless telephone audio interface of the call pod; and first and second circuits adapted to form a two-way voice path among the plurality of headsets and the wireless telephone interface within the call pod, wherein the call pod includes a sense circuit structured to automatically activate the call pod during a call and to automatically deactivate the call pod upon termination of the call wherein the sense circuit detects a microphone bias current on a microphone input of the wireless telephone and activates the call pod using the detected microphone bias current.

19. The apparatus for providing a conference call connection as in claim 18 further comprising a power switch adapted to automatically activate the call pod upon detection of a call connection.

20. The apparatus for providing a conference call connection as in claim 18 further comprising a flashing indicator adapted to provide indication of a call connection.

21. The apparatus for providing a conference call connection as in claim 18 further comprising a pushbutton adapted to mute a microphone of a call participant of the plurality of participants.

22. The apparatus for providing a conference call connection as in claim 9 further comprising a pushbutton adapted to mute the wireless telephone audio interface.

* * * * *